No. 837,806. PATENTED DEC. 4, 1906.
J. E. DENNISON.
SELF CHALKING CHALK LINE.
APPLICATION FILED NOV. 11, 1905.
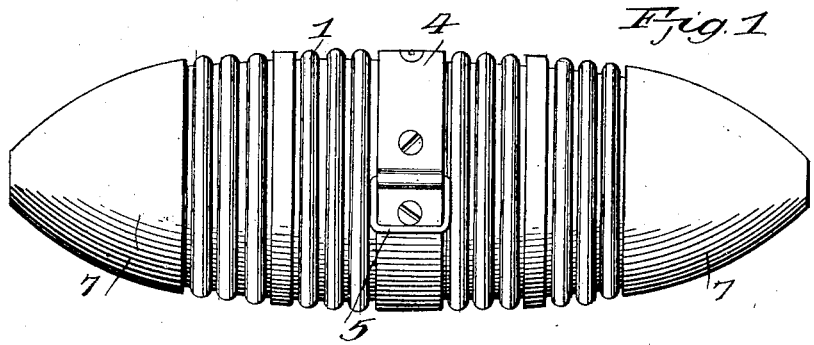
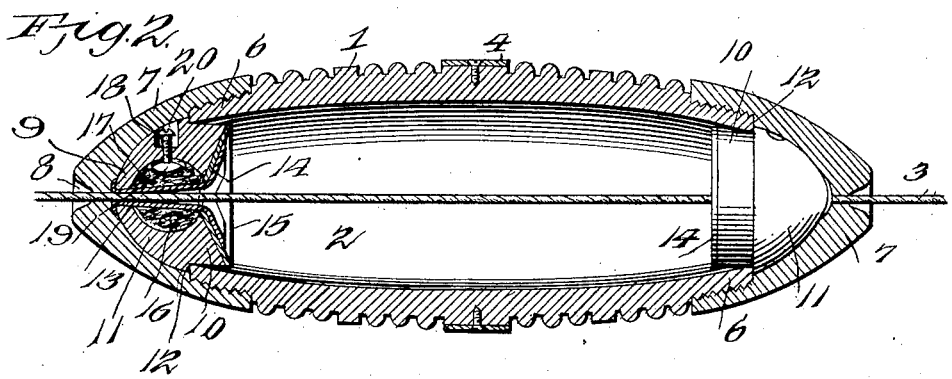
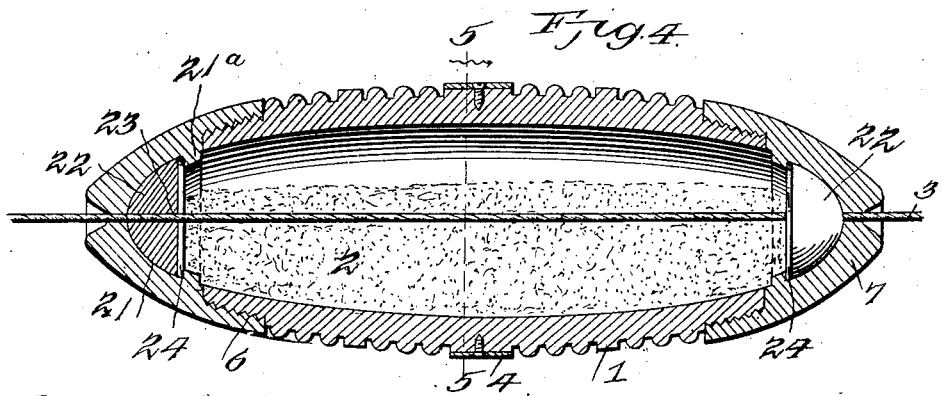
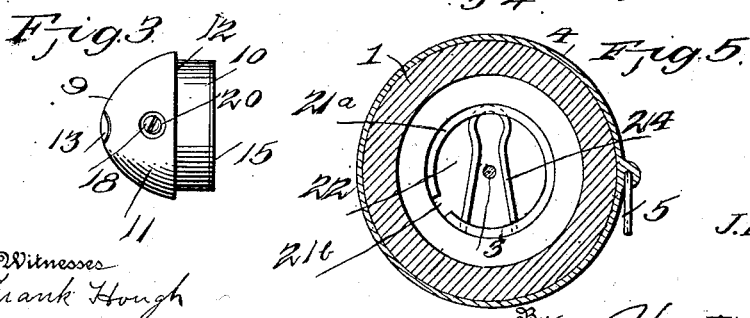
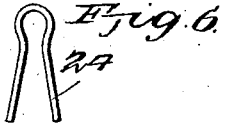
Inventor
J. E. Dennison
Witnesses
Frank Hough
C. C. Hines
By Victor J. Evans,
Attorney

UNITED STATES PATENT OFFICE.

JAMES E. DENNISON, OF MEDFORD, MASSACHUSETTS.

SELF-CHALKING CHALK-LINE.

No. 837,806.

Specification of Letters Patent.

Patented Dec. 4, 1906.

Application filed November 11, 1905. Serial No. 286,899.

*To all whom it may concern:*

Be it known that I, JAMES E. DENNISON, a citizen of the United States, residing at Medford, in the county of Middlesex and State of Massachusetts, have invented a new and useful Self-Chalking Chalk-Line, of which the following is a specification.

This invention relates to a line holder and chalker for the use of carpenters, masons, and other mechanics using chalk-lines, the object of the invention being to provide a device of this character about which the line may be wrapped when not in use and by which the line may be quickly, conveniently, and efficiently chalked.

In accordance with the principles of this invention chalk or other coloring-dust is confined in a convenient receptacle perforated at its ends for the passage of the line, the chalking being effected by drawing the line through the receptacle or running the receptacle along the line. In this way the line is effectually chalked or dusted, so that it may be used to strike one or more (usually three) lines. This mode of practice obviates the objections incident to the ordinary use of a piece of hard chalk, while giving better results.

The preferred embodiment of the invention is illustrated in the accompanying drawings, in which—

Figure 1 is a side elevation of the line holder and chalker. Fig. 2 is a central longitudinal section of the same. Fig. 3 is a side view of one of the plugs inserted in the ends of the barrel. Fig. 4 is a view similar to Fig. 3, showing a modification in the construction, one of the packing and scraping bushing-disks appearing in elevation and the other in section. Fig. 5 is a cross-section on line 5 5 of Fig. 4, and Fig. 6 is a detail view of one of the pins or keys for confining the bushing-disks in their receiving-sockets.

Referring now more particularly to the drawings, the numeral 1 represents a substantially cylindrical barrel or casing the body portion 2 of which forms a chamber to receive a charge of powdered chalk or other suitable substance to coat the chalk-line 3. This barrel is provided with a central encircling strengthening-band 4, carrying a pivoted ring or loop 5, to which one end of the chalk-line may be attached. The outer surface of the barrel constitutes a holder about which the line may be wrapped when not in use and may be annularly grooved to receive the coils or convolutions of the line, and thereby more securely retain the same in place.

The barrel is provided at each end with a reduced nipple or extension 6, which is externally threaded to receive a tapered or frusto-conical cap 7, which is suitably threaded to engage the same and provided at its outer end with an outlet-passage 8.

Closing each end of the barrel and retained in position by the cap is a plug 9, having a cylindrical portion 10 fitting within the nipple or extension 6. The plug is provided with an enlarged head 11, forming at its inner end a shoulder 12 to abut against the outer end of the nipple 6, said head having its outer surface tapered or substantially conical in form to closely fit the socket or chamber of the cap 7. The chamber 2 may be refilled with the powdered chalk or other coating substance used upon detaching either one of the caps and withdrawing the adjacent plug, which frictionally engages the inner wall of the nipple 6. Each plug 9 is provided with a bore or passage 13, the bores or passages of the two plugs being arranged in alinement with each other and with the passages 8 in the caps in order that the line to be chalked or coated may be threaded or extended longitudinally through the device, as shown in Fig. 2. This bore or passage 13 is provided at its inner end with a conical or flaring entrance 14, the bore and entrance containing a sheathing 15, corresponding in form thereto and composed of some suitable flexible or elastic material, such as felt or sheepskin.

Midway of the length of the bore or passage 13 each plug 9 is provided with an annular chamber or socket 16, containing some suitable soft and elastic backing, such as felt or hair, as shown at 17. This packing bears upon the cylindrical portion of the sheathing 15 and coöperates therewith to prevent to a maximum extent the escape of the chalk or other powdered substance at the end of the barrel and to remove excess chalk from the line. In order to increase this scraping action or removal of the excess chalk from the line, as well as to regulate the size of the passage and the resistance to the movement of the line through the barrel or the movement of the latter along the line, I provide each plug with an adjustable pressure member 18, the same comprising a screw-stem turning in a threaded opening at right angles to the passage and formed at its inner end with a head 19 to bear upon the packing 17 and force it to press upon the tubular portion of the sheathing 15 and upon the line, and at its outer end said stem is provided with the usual form of screw-head accessible through a socket or concavity 20, whereby an ordinary form of screw-driver may be employed to adjust said pressure member. By means of these pressure members the size of the passage formed by the tubular portion of the elastic sheathing 15 may be regulated to suit the size of the line to yieldingly regulate the resistance to the movement of the line and to also regulate the scraping action in removing the excess chalk.

In the modification disclosed in Figs. 4, 5, and 6 the construction is the same as that shown in Figs. 1, 2, and 3, except that the plugs 9 are dispensed with and the caps 7 are provided with sockets 21 to receive elastic packing disks or bushings 22, each having an opening 23, coinciding with the outlet 8 for the passage of the line 3. These packing disks or bushings are removably retained in position by U or staple shaped spring-locking pins or keys 24. Each pin 24 is adapted to fit between the inner end of the bushing and an annular shoulder 21$^a$ on the cap, which shoulder forms a contracted entrance to the socket through which the bushing is forced into the socket. The pin 24 prevents the bushing from being withdrawn from the socket under the pull of the line, and in order to provide for its insertion and removal the shoulder 21$^a$ is provided with a cut-away portion or notch 21$^b$ of less width than the space between the ends of the flared arms of the pin. To insert the pin, the head end or return-bend portion of the pin is inserted behind the shoulder 21$^a$ and the arms of the pin contracted or pressed together and entered through the notch 21$^b$, after which the pin may be turned until its arms pass out of alinement with said notch, as shown in Fig. 5. When inserted, the arms of the pin spread apart and give a widened or extended supporting-surface to sustain the pressure of the bushing under the pull of the line, as will be readily understood. The pin may be removed by an obvious reverse movement to permit withdrawal of the bushing when occasion requires. The elastic material of which these disks are made adapts them to perform both the function of a packing and a scraper to remove the excess chalk from the line.

In operation the chamber 2 is supplied with the desired amount of chalk or coating substance, the line threaded through the device in the manner shown in Fig. 2, and the coating operation performed either by holding the barrel stationary and drawing the line longitudinally therethrough or holding the line stationary and moving the barrel therealong, a partial rotary or oscillatory motion being imparted to the barrel at intervals to prevent the chalk from caking and to bring it in contact with the line. By this means the line will be thoroughly and effectually coated, and any excess amount of the chalk or coating material will be removed therefrom by the packing means, as will be readily understood.

From the foregoing description, taken in connection with the accompanying drawings, the construction and mode of operattion of the device will be apparent, and it will be seen that the invention provides a line-chalker which is simple of construction and by which the operation of chalking the line may be conveniently and expeditiously carried out.

Having thus described the invention, what is claimed as new is—

1. A line-chalking device comprising a barrel, caps closing the ends of the barrel and provided with line-passages, plugs in the caps provided with coinciding passages enlarged to form chambers, a tubular elastic sheathing lining the passage in each plug, and soft packing material in the chamber and backing the sheathing.

2. A line-chalking device comprising a barrel, caps closing the ends of the barrel, plugs inclosed by the caps, and having line-passages, the passage in each plug being centrally enlarged to form a chamber, a tubular sheathing lining the passage, a body of soft packing material in the chamber and encircling the tube, and a pressure device for compressing said packing.

3. A line-chalking device comprising a barrel having a reducing curvature from its center toward each end, the ends of the barrel being reduced and threaded, a conical screw-threaded cap engaging each threaded end of the barrel, each cap being provided with a conical chamber and a line-passage through its apex, and an elastic plug disposed in said passage and having a registering passage, the barrel being provided with an attaching element for securing one end of the line thereto and grooved for the reception and retention of the windings of the line.

4. A line-chalking device comprising a barrel having reduced screw-threaded ends, a conical screw-threaded cap engaging each threaded end of the barrel, each cap being provided with a conical chamber and a line-passage through its apex, and an elastic plug disposed in said passage and having a registering passage for the extension of the line through said plug.

In testimony whereof I affix my signature in presence of two witnesses.

JAMES E. DENNISON.

Witnesses:
PERCY H. SWEETSER,
CHARLES W. MACNEAR.